Figure 4:
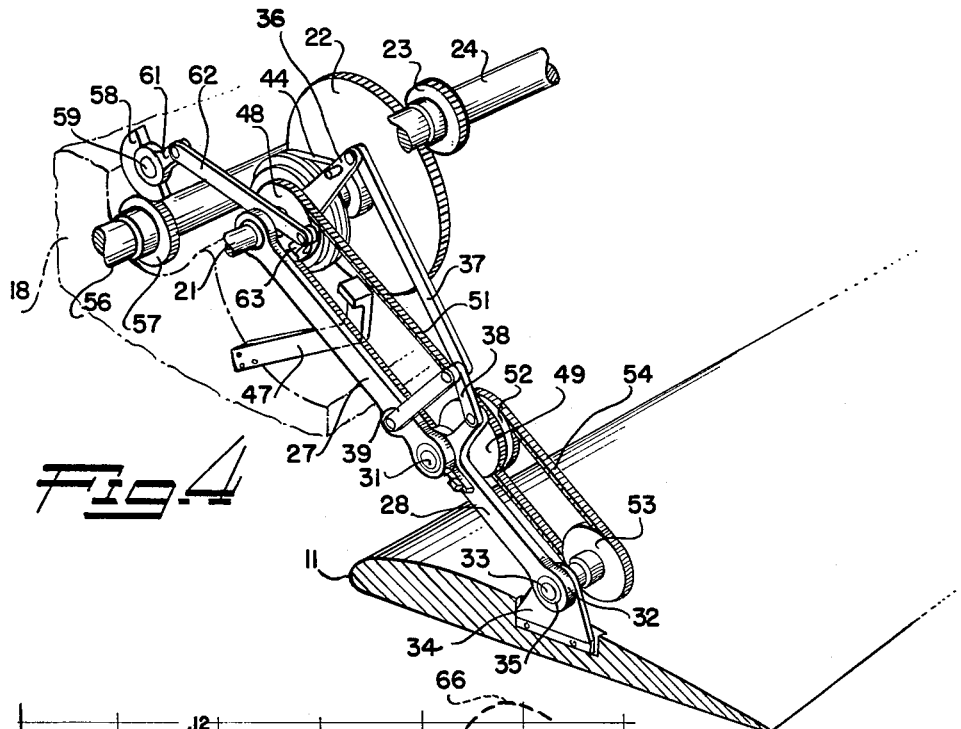

June 27, 1961  B. MAZELSKY  2,990,140
COMBINATION GUST ALLEVIATOR AND HIGH-LIFT
DEVICE FOR AIRCRAFT
Filed Oct. 24, 1958  3 Sheets-Sheet 1
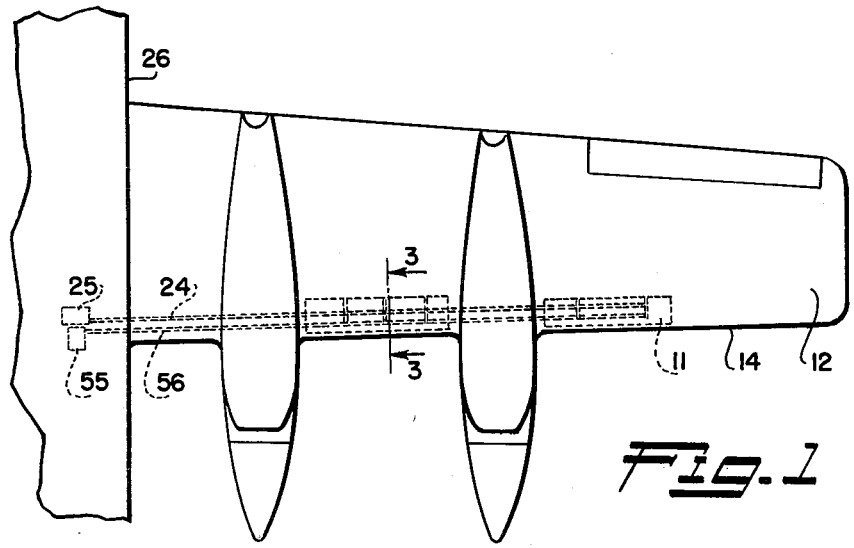
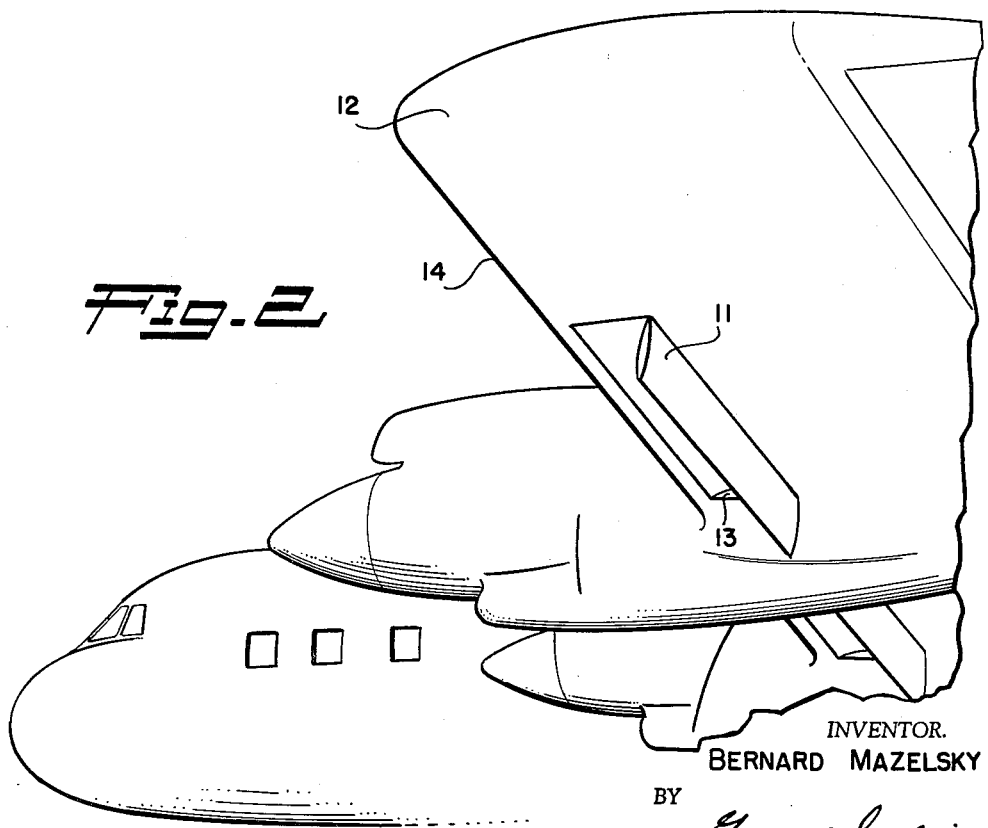
INVENTOR.
BERNARD MAZELSKY
BY
George C. Sullivan
Agent

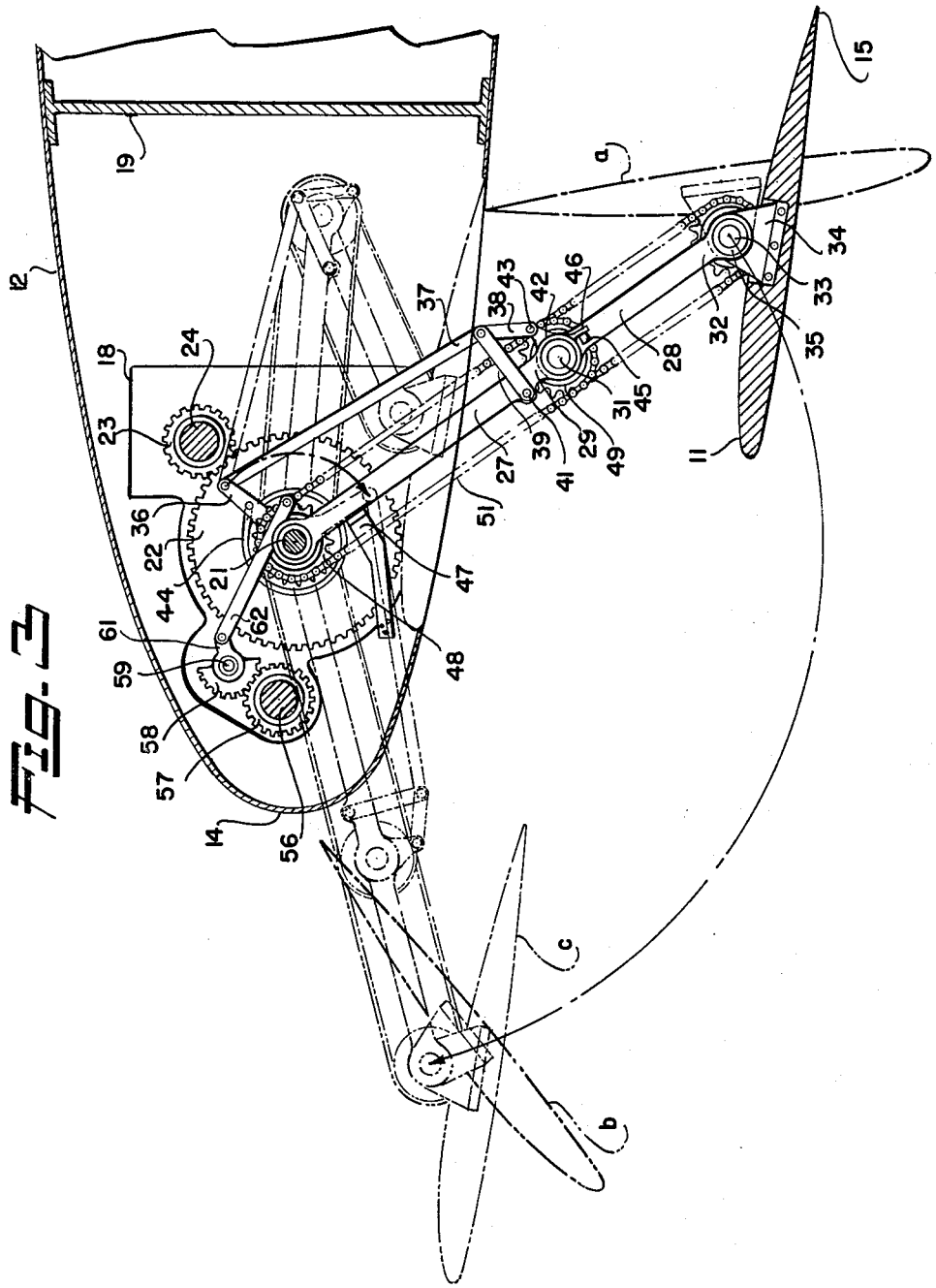

June 27, 1961  B. MAZELSKY  2,990,140
COMBINATION GUST ALLEVIATOR AND HIGH-LIFT
DEVICE FOR AIRCRAFT
Filed Oct. 24, 1958  3 Sheets-Sheet 3

INVENTOR.
BERNARD MAZELSKY
BY
*George C. Sullivan*
Agent

United States Patent Office 2,990,140
Patented June 27, 1961

2,990,140
COMBINATION GUST ALLEVIATOR AND HIGH-LIFT DEVICE FOR AIRCRAFT
Bernard Mazelsky, Van Nuys, Calif., assignor to Lockheed Aircraft Corporation, Burbank, Calif.
Filed Oct. 24, 1958, Ser. No. 769,398
6 Claims. (Cl. 244—42)

This invention relates generally to aircraft and more particularly to a combination gust alleviator and high-lift device for mounting on the wing of aircraft, primarily those of the transport type to provide increased passenger comfort and relief against structural fatigue while traversing atmospheric turbulence.

The problem of providing smooth flight while traversing atmospheric turbulence has been studied by almost every type of aeronautical organization since the development of the airplane. However, to date there are no known gust alleviation devices incorporated in production airplanes. This situation is due mainly to the fact that the prior art devices are based on extremely complicated dynamic systems. Such systems have posed problems which have been considered unsolvable and unreliable during development resulting in the conclusion that the disadvantages outweigh their potential benefits.

As stated above, the known prior art devices depend upon a dynamic type of action to provide gust alleviation. This is a normal approach since the airplane pitching motions which are to be alleviated are themselves dynamic in nature; however, such systems excessively reduce lateral and longitudinal stability and are, because of their complexity, insufficiently reliable.

It is an object of this invention to provide a static type gust alleviator which is also capable of functioning as a high-lift device. Briefly, the invention involves the use of a movable deflector panel mounted on the underside of the aircraft wing and arranged to be stowed within the wing or extended to either of two operative positions, one ahead of the wing and serving as a leading edge slat and the other projecting outwardly from the lower surface of the wing generally normal to the wing chord for gust alleviation.

It is another object of this invention to provide a gust alleviator and high-lift device, operable at the will of the pilot, which is simple in construction and operation and which is capable of providing at least 50% alleviation of pitch acceleration loads and such motions which would be adverse to passenger comfort.

It is another object of this invention to provide a gust alleviator and high-lift device which is capable of effecting a reduction in the over-all structural weight of an aircraft due to the alleviation of fatigue stresses to which the aircraft would otherwise be subjected in flight.

Still another object of this invention is to provide a gust alleviator and high-lift device which may also function to provide a controlled drag increase for decelerating an aircraft. This is a highly useful secondary feature for aircraft designed for high altitude cruising, since it will allow a steep descent to a landing without exceeding maximum safe speed limits.

Further and other objects will become apparent from a reading of the following detailed description especially when considered in combination with the accompanying drawing wherein like numerals refer to like parts.

Figure 5:
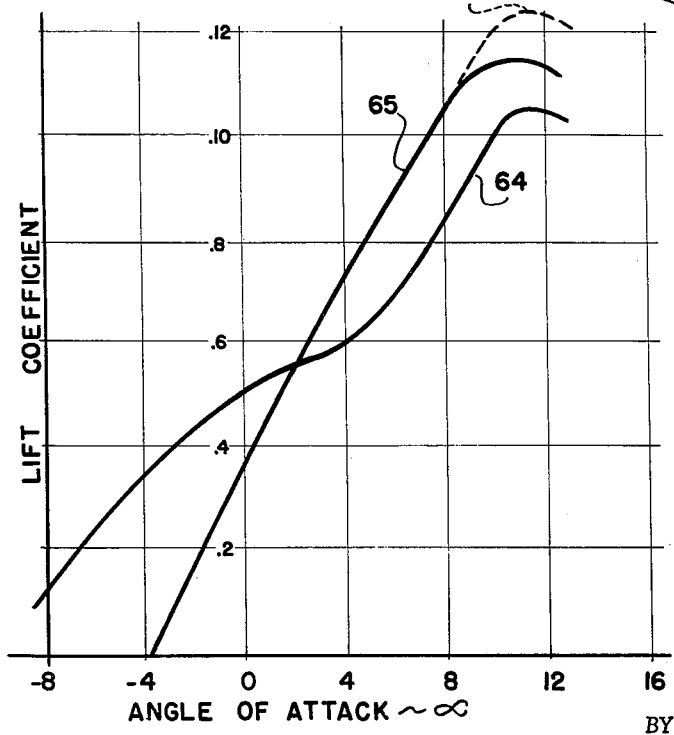

In the drawing:
FIGURE 1 is a fragmentary plan view of an aircraft showing the wing incorporating the gust alleviator and high-lift device of this invention;
FIGURE 2 is a perspective view showing the device of this invention in the gust alleviating position on an aircraft;
FIGURE 3 is a sectional view taken on line 3—3 of FIGURE 1 showing the deflector actuating mechanism;
FIGURE 4 is a perspective view schematically showing the deflector actuating mechanism; and
FIGURE 5 is a plot showing the change in lift coefficient with changes in angle of attack with and without the deflector in the gust alleviating position.

Referring to FIGURES 1 and 2 the combination gust alleviator and high-lift device includes a deflector panel 11 which is preferably made airfoil in shape with a chord length of approximately 10% of the chord length of wing 12 on which the deflector 11 is attached. The length or span of deflector 11 in a spanwise direction relative to the span of wing 12 may be varied to meet the requirements of a particular application, however, it will normally be between 25 and 50% of the wing span. A recess 13 formed in the underside of the wing adjacent the leading edge 14 is adapted to receive deflector 11 in the stowed position providing a normal smooth wing contour as indicated in FIGURE 3.

As a gust alleviator, deflector 11 projects outwardly from the wing generally normal to the wing chord at a location aft of leading edge 14, approximately 15% of the wing chord. The trailing edge 15 of deflector 11 in the gust alleviating position a as shown in FIGURE 3 is substantially contiguous with the underside of the wing so as to avoid any appreciable airflow between the wing and deflector. The deflector must interrupt the flow of air at the proper location under the wing to be effective in performing the gust alleviating function.

The high-lift position b of deflector 11 as shown in FIGURE 3 is forwardly of the wing leading edge 14 and arranged at an angle of attack to effectively increase the camber of the wing and hence its ability to produce lift. The deflector in the high-lift position is functionally analogous to a leading edge slat.

The mechanism by which deflector 11 is moved between the stowed, gust alleviating and high-lift positions may take many forms, the embodiment shown by FIGURES 1, 3 and 4 being typical. An actuator housing 18 carried within wing 12 and forwardly of front spar 19 rotatably supports a shaft 21. Gear 22, fixedly secured to shaft 21, engages drive gear 23 secured to shaft 24 for controlling rotation of shaft 21. Shaft 24 is supported for rotation adjacent drive gear 23 by housing 18 and extends in a spanwise direction inside the leading edge of the wing to a drive motor 25 located inside the aircraft fuselage 26 as indicated in FIGURE 1. Through operation of motor 25 shaft 21 may be rotated to any desired angular position.

Deflector 11 is connected to shaft 21 through levers 27 and 28. Lever 27 is fixedly secured to shaft 21 at one end and the opposite end 29 is joined to lever 28 through pin 31 permitting swinging movement of lever 28 relative to lever 27. The free end 32 of lever 28 engages a pin 33 fixedly secured to a bracket 34 on deflector 11. Suitable bearing means 35 allows swinging movement of deflector 11 relative to lever 28.

In both the gust alleviating and high-lift positions of deflector 11, levers 27 and 28 are generally coaxially aligned whereas in the stowed position the two levers are folded as indicated by phantom lines in FIGURE 3. To control the relative movement between levers 27 and 28, a special linkage arrangement is employed wherein a stop limited floating lever 36 on shaft 21 is pinned to a lever 37 which in turn engages one end of levers 38 and 39. Lever 39 is pinned at 41 to lever 27. Lever 38 engages a bell crank like arm 42 on lever 28 through pin 43. As is apparent in FIGURE 3, movement of lever 37 relative to lever 27 will effect relative rotation of lever 28 due to the kinematics of the lever arrangement. This relative movement between levers 37 and 27 is effected by rotation of shaft 21 while holding floating lever 36 in the one extreme position shown in solid lines by means of torsion spring 44.

A detent 45 on lever 28 is arranged to engage a pawl 46 on lever 27 and limit the movement of lever 28 relative to lever 27 beyond the coaxially aligned extended position. Hence, continued rotation of shaft 21 beyond that required to move shafts 27 and 28 to the coaxially aligned position overcomes the force exerted on floating lever 36 by spring 44 causing floating lever 36 to move with levers 27 and 28 as the mechanism moves deflector 11 from the gust alleviating position below the wing to the high-lift position ahead of the wing. A stop detent 47 on housing 18 limits the travel of floating lever 36 to maintain levers 27 and 28 in the coaxially aligned condition even though the deflector at a high-lift angle of attack may produce forces in a direction tending to retract the mechanism.

Controlled rotation of deflector 11 about the axis of pin 33 from a minimum drag attitude indicated by position $c$ to either the gust alleviating position $a$ or the high-lift position $b$ is effected by the chain and sprocket arrangement of FIGURES 3 and 4. Sprocket wheel 48 floating on shaft 21 drives a sprocket wheel 49 through chain 51. Sprocket wheel 49 floats on pin 31 with another sprocket wheel 52 and the two sprocket wheels are suitably fixedly secured together whereby sprocket wheel 52 rotates with sprocket wheel 49. A sprocket wheel 53, as best shown in FIGURE 4, is secured to pin 33 on bracket 34 so that it will effect rotation of deflector 11 through chain 54 by rotating sprocket 48 on shaft 21. Controlled rotation of sprocket wheel 48 is effected by a drive motor 55 operating through a torque tube shaft 56 as shown in FIGURES 1 and 4. Motor 55 is carried inside fuselage 26 and torque tube shaft 56 extends in a generally spanwise direction inside the wing adjacent its leading edge to the deflector actuating mechanism where it is suitably rotatably supported within housing 18. A drive gear 57 secured to shaft 56 engages a sector gear 58 and causes rotation thereof about pin 59 in response to rotation of shaft 56. An arm or lever 61 on sector gear 58 pivotally connects with a lever 62 joining the sector gear with sprocket wheel 48 through a bracket lever 63 secured to the sprocket wheel. As the sector gear 58 is rotated by operation of motor 55, the chain drive mechanism is caused to correspondingly rotate deflector 11 about the axis of pin 33. It is apparent that extension and retraction of the gear is completely independent of the chain drive system which controls the deflector angle of attack and that the angle of attack of the deflector is changed only by rotation of torque tube shaft 56 through operation of motor 55. Hence, the deflector supporting levers 27 and 28 may be moved from the stowed position to the fully extended position while maintaining deflector 11 in a minimum drag angle of attack without having to also actuate the chain drive mechanism. After the linkage has moved to the fully extended position for gust alleviation or high-lift, deflector 11 may be then rotated to the desired angle of attack for performing its function. The two control motors 25 and 55 may therefore be operated independently.

Operation of motors 25 and 55 is controlled at the discretion of the pilot. Upon entering turbulent air the pilot operator first actuates motor 25 effecting rotation of shaft 24 which moves the deflector supporting linkage from the retracted position to the extended coaxially aligned position shown in solid lines in FIGURE 3. Motor 55 is then actuated to rotate shaft 56 which effects rotation of deflector 11 to position $a$ shown in dotted lines in FIGURE 3 wherein the deflector projects outwardly from the lower surface of the wing generally normal to the wing chord at a location approximately 15% of the wing chord aft of the wing leading edge. In this position of the deflector the positive pressure under the wing is reduced by causing separated flow underneath the wing, which flow tends to reattach the flow at the wing trailing edge. As the angle of attack of the wing is increased the reattachment point moves more and more forward until very little separation occurs. Thus, at low angles of attack the deflector experiences maximum effectiveness as is illustrated by curve 64 in FIGURE 5. This obviously is a most desirable characteristic of the deflector since in virtually all cases where a gust alleviator is needed the aircraft is trimmed to fly at a low angle of attack.

The separated flow caused by the deflector has little effect on circulation about the wing since it does not produce a disturbance at the leading and trailing edges due to the reattachment characteristics of the flow. As a result, the normal wing lift is recovered almost instantaneously upon rotating the deflector from the gust alleviator position to the low drag attitude. The separated region does, however, change the effective camber of the wing and it is this affect which results in decreasing the rate of change of lift coefficient with respect to changes in angle of attack to provide gust alleviation.

Lift curve 65 represents the lifting characteristics of the wing with the deflector in the stowed position. The deflector in the gust alleviating position changes the shape of lift curve 65 to that of lift curve 64 and as is apparent in FIGURE 5 at angles of attack of the wing below approximately five degrees there is much less change in lift coefficient with changes in angle of attack as compared with the lift curve representing the basic wing with the deflector in the stowed position. It is this change in lift curve slope which effects gust alleviation.

Upon leaving a turbulent air region the pilot actuates motor 55 to return deflector 11 to the zero lift angle of attack position and then actuates motor 25 to retract the deflector to the stowed position within the wing contour.

While a deflector for gust allevation having a height of approximately 10% of the wing chord and located approximately 15% of the wing chord aft of the wing leading edge is preferred, it should be understood that these percentages are subject to substantial variation depending upon a particular design. For example, the deflector height may vary from in the neighborhood of 5% to 25% of the wing chord and its location in the gust alleviating position with respect to the leading edge of the wing may be in the neighborhood of 5% of the wing chord aft of the leading edge to as much as 60% of the wing chord aft of the leading edge.

Maximum effectiveness of the gust alleviator is obtained when used in conjunction with the aircraft autopilot system. Therefore the autopilot would normally be turned on whenever the deflector is used for gust allevation, however, this is not considered to be an operating procedure essential to the invention.

Under flight conditions where maximum lift coefficient ($C_{Lmax}$) augmentation is desired such as in a final landing approach where a minimum touch-down speed is desired, the deflector may be extended to the high-lift position $b$ as shown in FIGURE 3. Movement to this position from the stowed position is effected by operation of motor 25 extending deflector supporting levers 27 and 28 to the generally coaxially aligned position through rotation of shaft 24 and then continuing rotation of shaft 24 to position the deflector ahead of the wing leading edge. During movement of the deflector from the stowed position to the extended position ahead of the wing it is maintained in the minimum drag angle of attack attitude at which it is stowed through the simple expedient of keeping motor 55 de-energized. Upon completion of rotation of lever members 27 and 28, the chain drive mechanism, through operation of motor 55, rotates the deflector from the minimum drag angle of attack $c$ to the angle of attack position $b$ providing an increase in the maximum lift coefficient of the wing. This increase in maximum lift coefficient is represented by the dotted line extension 66 of lift curve slope 65 in FIGURE 5.

Retraction of the deflector from the high-lift position is effected through sequential operation of motors 25 and 55. The deflector is first rotated to the minimum drag attitude and then deflector supporting levers 27 and 28 are swung about shaft 21 as a pivot to return the deflector to the stowed position.

To provide fail-safe operation of the deflector, two design features are built into the device. First, the deflector is made generally airfoil in shape so that its center of lift will be displaced in a chordwise direction from its center of gravity. Secondly, the axis of pin 33 about which the deflector pivots is displaced in a chordwise direction from the deflector center of lift. Thus the deflector will be rotated to a low drag attitude by the aerodynamic forces acting on it in the event of a failure in the chain drive angle of attack control mechanism. The direction of the displacement of the pivot axis from the center of lift may be towards either the leading or trailing edges of the deflector, although it is generally preferable to locate the pivot axis off the center of lift in the direction of the deflector center of gravity. Location near the center of gravity is desired so that the deflector weight will not have any substantial effect on the attitude it is urged to assume by the aerodynamic forces.

While a specific mechanism has been shown and described for effecting movement of the deflector from the stowed position to either the gust alleviating or high-lift positions it should be understood that any mechanism which will so move the deflector to the desired positions and maintain a deflector angle of attack to provide minimum drag during translational movement may be employed without departing from the teachings of the invention. Also, the deflector may be used to perform other functions such as that of a drag brake to provide forces for deceleration.

It should be understood that certain alterations, modifications and substitutions such as those suggested hereinabove may be made to the instant disclosure without departing from the spirit and scope of the invention as defined by the appended claims.

I claim:

1. In an aircraft having a wing, a spanwise recess formed in the underside of said wing intermediate of the leading and trailing edges thereof, an airfoil shaped deflector having a chord length less than 25% of the wing chord and adapted to be received in said recess, and actuating means connecting said deflector to the wing and guiding said deflector between a stowed position substantially filling said recess, a gust alleviating position projecting outwardly from the underside of the wing and generally normal thereto, and a high-lift position ahead of the wing forming a leading edge slat.

2. A device as set forth in claim 1 wherein said actuating means connects with said deflector off the deflector center of lift whereby the aerodynamic forces on the deflector urge it towards a minimum drag attitude.

3. An aircraft having a wing, a deflector panel, a hinge connecting the deflector panel to the wing, drive means actuating said hinge and selectively moving said deflector panel between a stowed position against the underside of the wing and an extended position projecting laterally outwardly therefrom, and drive means coupling with said deflector panel and controllably varying rotational movement thereof relative to the hinge.

4. A gust alleviator for aircraft having a wing comprising, a deflector panel, hinge means connecting said deflector panel to said wing, said hinge means guiding said deflector panel between a stowed position against the wing, a position generally normal to the wing on the underside thereof and a position ahead of the wing forming a leading edge slat, and hinge drive means remotely controlling the movement of said deflector panel.

5. A gust alleviating device for winged aircraft comprising, a spanwise deflector secured to the wing aft of the leading edge and ahead of the 50% chord point, means selectively moving said deflector between a stowed position substantially within the wing contour and an extended position projecting outwardly transversely of the wing and forwardly of the 50% chord point for decreasing the rate of change of the wing lift coefficient with respect to changes in angle of attack, and means swinging said deflector forwardly of the wing leading edge to an angle of attack position increasing the wing maximum lift coefficient.

6. An aircraft having a wing, a deflector panel, a hinge connecting the deflector panel to the wing, means selectively moving said deflector panel between a stowed position against the underside of the wing and an extended position projecting laterally outwardly therefrom ahead of the 50% chord point and means coupling with said deflector panel and controllably varying rotational movement thereof relative to the hinge.

References Cited in the file of this patent

UNITED STATES PATENTS

| | | |
|---|---|---|
| 1,806,379 | Wood | May 19, 1931 |
| 2,148,967 | Scheu | Feb. 28, 1939 |
| 2,158,686 | Barnhart | May 16, 1939 |
| 2,346,464 | Tampier | Apr. 11, 1944 |

FOREIGN PATENTS

| | | |
|---|---|---|
| 143,953 | Great Britain | June 10, 1920 |
| 652,958 | France | Oct. 30, 1928 |